(12) United States Patent
Takahashi

(10) Patent No.: US 7,262,819 B2
(45) Date of Patent: Aug. 28, 2007

(54) BROADCAST RECEIVER

(75) Inventor: Satoshi Takahashi, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 525 days.

(21) Appl. No.: 10/944,900

(22) Filed: Sep. 21, 2004

(65) Prior Publication Data
US 2005/0088577 A1  Apr. 28, 2005

(30) Foreign Application Priority Data
Oct. 27, 2003  (JP) .............................. 2003-366412

(51) Int. Cl.
*H04N 5/64* (2006.01)
(52) U.S. Cl. ..................................... 348/836
(58) Field of Classification Search ................ 348/836, 348/839, 731, 725
See application file for complete search history.

(56) References Cited

U.S. PATENT DOCUMENTS

| | | | |
|---|---|---|---|
| 4,577,220 A * | 3/1986 | Laxton et al. ................. | 725/15 |
| 4,587,567 A * | 5/1986 | Yamamori et al. ........... | 348/825 |
| 5,032,912 A * | 7/1991 | Sakariassen ................. | 348/52 |

FOREIGN PATENT DOCUMENTS

| | | |
|---|---|---|
| JP | 10-66036 | 3/1998 |
| JP | 11040241 | 2/1999 |
| JP | 2001-54066 | 2/2001 |
| JP | 2002-77797 | 3/2002 |

OTHER PUBLICATIONS

International Search Report corresponding to application No. PCT/JP03/05564 dated Sep. 9, 2003.

* cited by examiner

*Primary Examiner*—Paulos M. Natnael
(74) *Attorney, Agent, or Firm*—Pillsbury Winthrop Shaw Pittman, LLP

(57) ABSTRACT

A broadcast receiver comprising: a tuner having an input plug which receives the radio-frequency signal, has its base portion connected to a circuit board and its tip portion protruded outward through one of the two end surfaces of a shield case which are opposed to each other in the direction of length, the tip portion being bent through a predetermined angle with respect to the base portion and the base portion being supported by the shield case so that it can rotate on its axis, the tuner being mounted so that one of the four side surfaces of the shield case except the two end surfaces which are opposed to each other in the direction of length is parallel to a display panel of a display unit.

7 Claims, 4 Drawing Sheets

BROADCAST RECEIVER

CROSS-REFERENCE TO RELATED APPLICATIONS

This application is based upon and claims the benefit of priority from prior Japanese Patent Application Ser. No. 2003-366412, filed Oct. 27, 2003, the entire contents of which are incorporated herein by reference.

BACKGROUND OF THE INVENTION

1. Field of the Invention

The present invention relates to a broadcast receiver which receives a television signal by way of example and more specifically to improvements in the terminal structure of its tuner.

2. Description of the Related Art

As is well known, flat- and large-screen television broadcast receivers using liquid crystal panels and plasma display panels (PDPs) have come into wide use recently. With these television receivers, in order to make their depth small, space in which various modules are housed is severely restricted.

On the other hand, the tuner that down-converts a radio-frequency signal received by an antenna to select a television signal of a desired channel has a tuner body formed in the shape of an almost rectangular parallelepiped and is configured such that an antenna input plug for connection to an antenna cable protrudes from one of the two end surfaces of the tuner body which are opposed to each other along the direction of its length.

For this reason, in incorporating the tuner into a television broadcast receiver, making the direction of the length of the tuner coincident with the direction of the depth of the receiver is not effective in making the depth of the receiver small. Therefore, the tuner needs to be set so that its antenna input plug is oriented left, right, up, or down when viewed from the back side of the receiver.

With general television broadcast receivers, however, it is not usual to set the tuner so that the antenna input plug is oriented up. In addition, setting the tuner so that the antenna input plug is oriented left or right will suppress user's freedom to lay the antenna cable in installing a television broadcast receiver.

Furthermore, when the antenna input plug is oriented down, it is impossible to set the tuner in a low position in view of the convenience of user's work of connecting the antenna cable to the antenna input plug, that is, in order to ensure space sufficient to accommodate user's hands. From such a viewpoint as well, the place where the antenna input plug is to be set is restricted.

Japanese Unexamined Patent Publication No. 11-40241 discloses a connector for electronic equipment that allows space between the back of the electronic equipment and wall to be reduced. However, this Patent Publication describes nothing about the placement of the tuner involved in making the depth of a television broadcast receiver small.

BRIEF SUMMARY OF THE INVENTION

According to one aspect of the present invention, there is provided a broadcast receiver comprising: a tuner having a circuit board formed with a circuit block which down-converts an input radio-frequency signal to select a broadcast signal of a desired channel, a shield case formed in the shape of an almost rectangular parallelepiped to house the circuit board, an input plug which receives the radio-frequency signal, has its base portion connected to the circuit board and its tip portion protruded outward through one of the two end surfaces of the shield case which are opposed to each other in the direction of length, the tip portion being bent through a predetermined angle with respect to the base portion and the base portion being supported by the shield case so that it can rotate on its axis, and a terminal connected to the circuit board and protruded outward through one of the side surfaces of the shield case to output the selected signal; a signal processing unit connected to the terminal and adapted to recover a video signal from the signal output from the terminal; and a display unit adapted to display the video signal recovered by the signal processing unit on a display panel, the tuner being mounted so that one of the four side surfaces of the shield case except the two end surfaces which are opposed to each other in the direction of length is parallel to the display panel of the display unit.

DETAILED DESCRIPTION OF THE INVENTION

Figure 1:
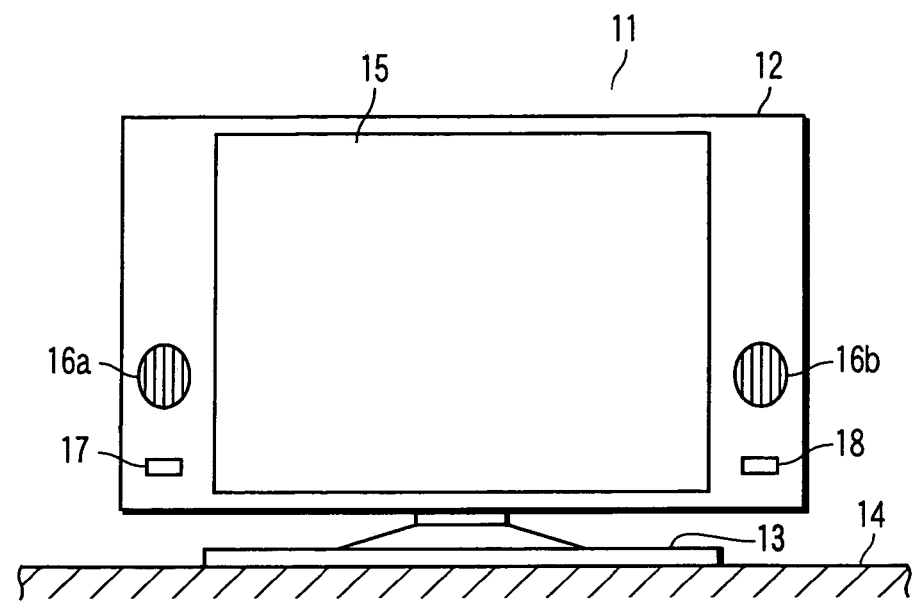
FIG. 1 is a front view of a television broadcast receiver according to an embodiment of the present invention.

An embodiment of the present invention will be described hereinafter with reference to the accompanying drawings. FIG. 1 is a front view of a television broadcast receiver 11 of this embodiment. The television broadcast receiver 11 is composed mainly of a cabinet 12 and a support 13 that supports the cabinet 12.

The cabinet 12 is formed in the shape of a flat panel which is nearly rectangular and small in thickness. The support 13 is rotatably mounted to the cabinet 11 at the center of its lower portion along the direction of the length and, when placed on a horizontal base 14, supports the cabinet 12 upright.

In the cabinet 12 a liquid crystal display unit 15 is incorporated in the center on the front side. On the front side of the cabinet 12 a pair of speakers 16a and 16b, a power switch 17 and a receiver 18 adapted to receive operating information transmitted from a remote controller are placed on the opposite sides of the liquid crystal display unit 15.

Figure 2:
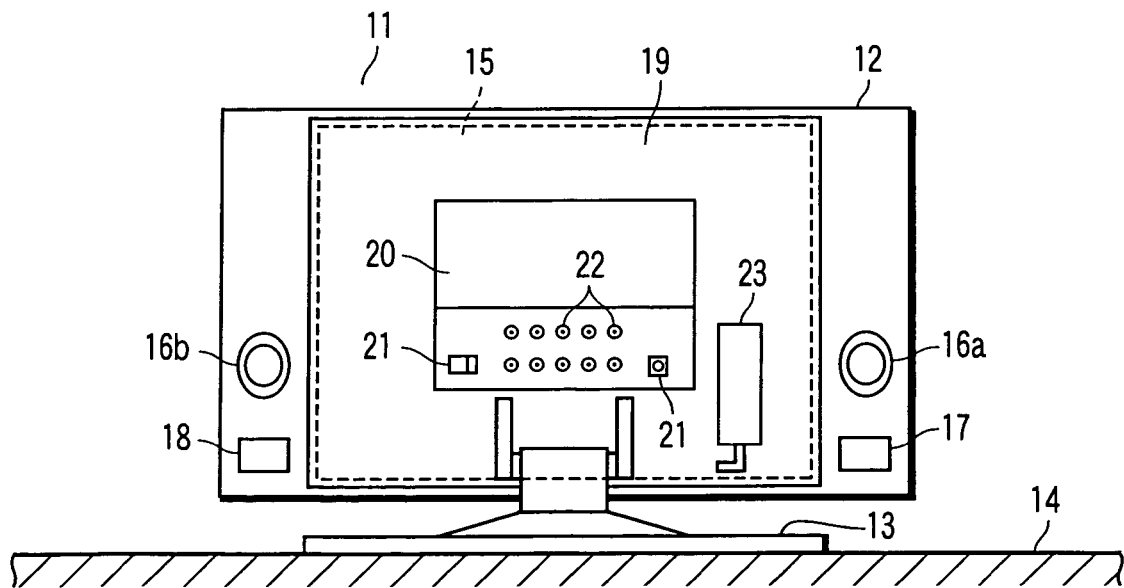
FIG. 2 is a rear view of the television broadcast receiver of the present invention.

FIG. 2 is a rear view of the television broadcast receiver 11. The support 13, the liquid crystal display unit 15, the pair of speakers 16a and 16b, the power switch 17 and the receiver 18 are placed in the above positions on the cabinet 12.

On the back side of the liquid crystal display unit 15 a main board 19 is placed so that it is substantially parallel to the display panel. On the main board 19 are mounted a signal processing circuit unit 20, an operating key 21, connectors 22 for connection to outside and a tuner 23.

The signal processing circuit unit 20 has a drive circuit for driving the liquid crystal display unit 15, a demodulation circuit for recovering video and audio signals from an output signal of the tuner 23, a power supply circuit, and so on built in.

Figure 3:
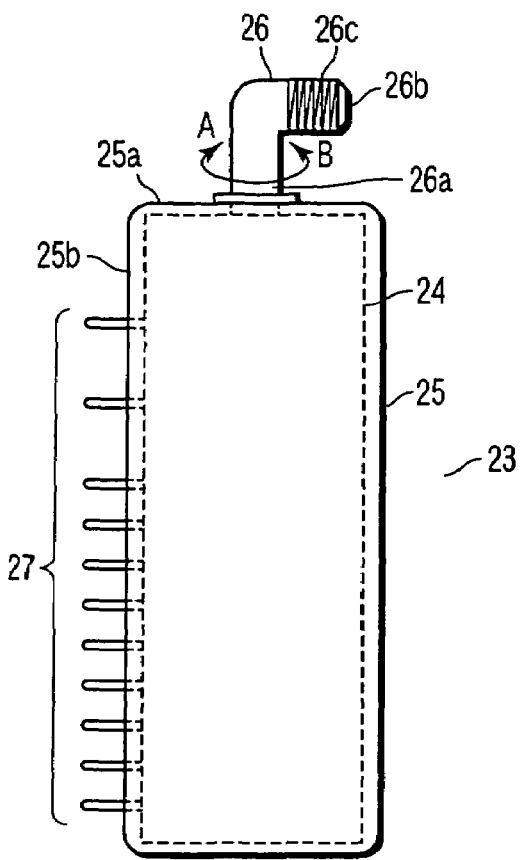
FIG. 3 is a diagram for use in explanation of the detailed form of the antenna input plug of the tuner of the television receiver of the present invention.

FIG. 3 shows the detail of the tuner 23. The tuner 23 is configured such that a circuit board 24 formed on top with a circuit block adapted to down-convert a radio-frequency signal received by the antenna and select a television broadcast signal of a desired channel is housed in a shield case 25 formed in the shape of an almost rectangular parallelepiped.

To the circuit board 24 is connected an antenna input plug 26 formed in the shape of an almost cylinder, which is protruded outward through one end surface 25a (one of the two end surfaces opposed to each other in the direction of length) of the shield case 25 which is the body of the tuner 23.

The antenna input plug 26 has its tip portion 26b bent into an L-shape, i.e., bent through 90 degrees with respect to its base portion 26a. The tip portion 26b is formed with a thread groove 26c for connecting an antenna cable. The antenna input plug 26 is supported so that its base portion 26a can rotate on its axis as indicated by arrows A and B in FIG. 3.

To the circuit board 24 are connected a plurality of terminals 27, which are protruded outward through one side surface 25b of the shield case 25. The terminals 27 are electrically connected to the signal processing circuit unit 20 when the tuner 23 is mounted to the main board 19.

In that case, the tuner 23 is mounted to the main board 19 so that one of the four side surfaces of the shield case 25 except its two end surfaces opposed to each other in the direction of the length is parallel to the main board. Mounting the tuner 23 to the main board 19 so that two of the four side surfaces of the shield case 25 except the two end surfaces opposed to each other in the direction of the length which are most closely opposed to each other are parallel to the main board 19 will be effective in further reducing the depth of the television broadcast receiver 11.

A radio-frequency signal received by the antenna is applied to the antenna input plug 26 over the antenna cable and then sent to the circuit block on the circuit board 24, whereby a television broadcast signal of a desired channel is selected.

The television broadcast signal thus selected is applied through the terminal 27 to the signal processing circuit unit 20 where video and audio signals are recovered. The video and audio signals are reproduced by the liquid crystal display unit 15 and the speakers 16a and 16b, respectively.

As described above, the tuner 23 is constructed such that its antenna input plug 26 is bent into a nearly L-shape and is rotatably mounted to the shield case 25. When the tuner 23 is mounted to the main board 19 with the antenna input plug 26 downward as shown in FIG. 4, therefore, the distance h1 between the antenna input plug 26 and the base 14 can be decreased below the current value.

Figure 5:
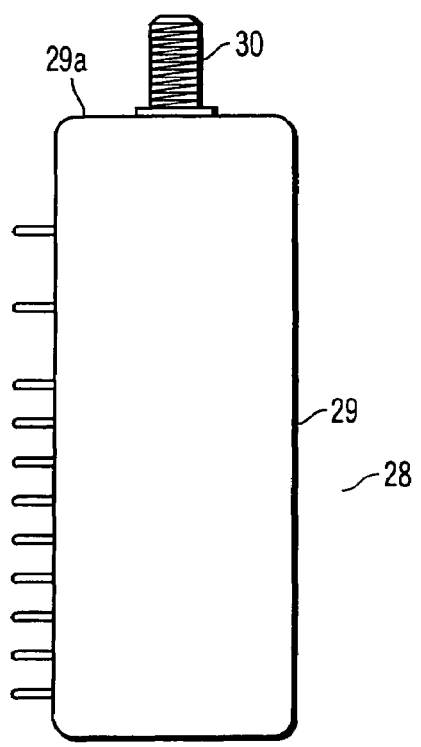
FIG. 5 is a diagram for use in explanation of the detailed form of the antenna input plug of the conventional tuner.

That is, as shown in FIG. 5, an existing tuner 28 is constructed such that an antenna input plug 30 formed in the shape of a cylinder is protruded straight from one end surface 29a of a shield case 29.

Figure 4:
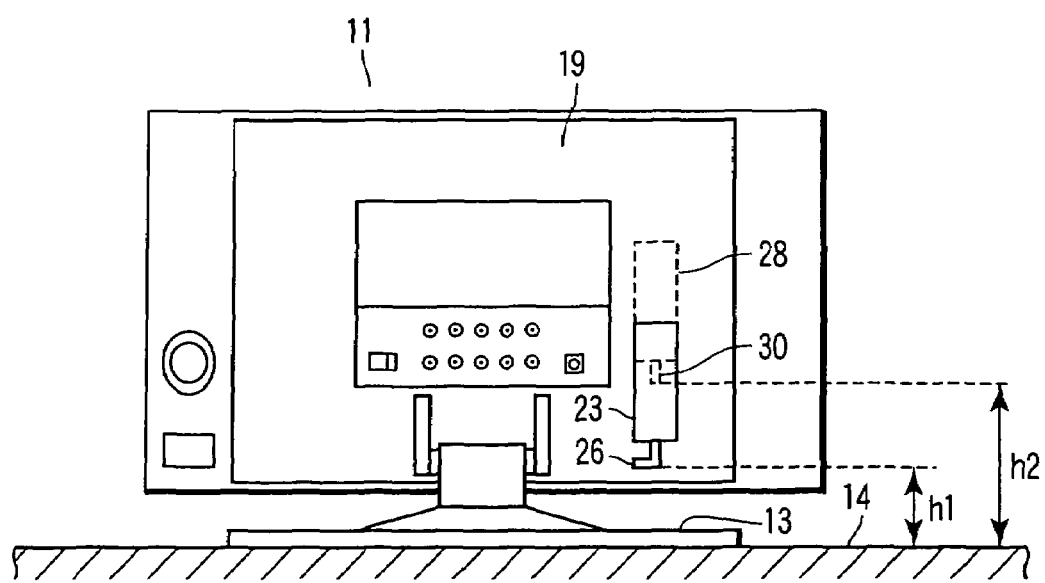
FIG. 4 is a diagram for use in explanation of the difference in mounting position between the tuner of the inventive television broadcast receiver and the tuner of a conventional television receiver.

For this reason, when the tuner 28 is mounted to the main board 19 with the antenna input plug 30 downward as shown by dotted line in FIG. 4, it is required to secure space sufficient to accommodate user's hands in order for the user to connect an antenna cable to the antenna input plug 30.

For this reason, it is required to set the distance h2 between the antenna input plug 29 and the base 14 larger than a certain value. This decreases the degree of freedom of mounting the tuner 28 to the main board.

However, bending the antenna input plug 26 into a nearly L-shape allows space sufficient to accommodate user's hands to be secured when the user connects an antenna cable to the antenna input plug 26.

Thus, the distance h1 between the antenna input plug 26 and the base 14 can be reduced below the current distance h2, allowing the degree of freedom in selection of the position in which the tuner 23 is to be mounted to be increased.

In addition, rotatably mounting the antenna input plug 26 to the shield case 25 allows the antenna cable to be connected to the television broadcast receiver 11 from either of the left and right directions. This provides greater freedom in installation of the television broadcast receiver 11 and ensures user's convenience at a practical level.

Figure 6:
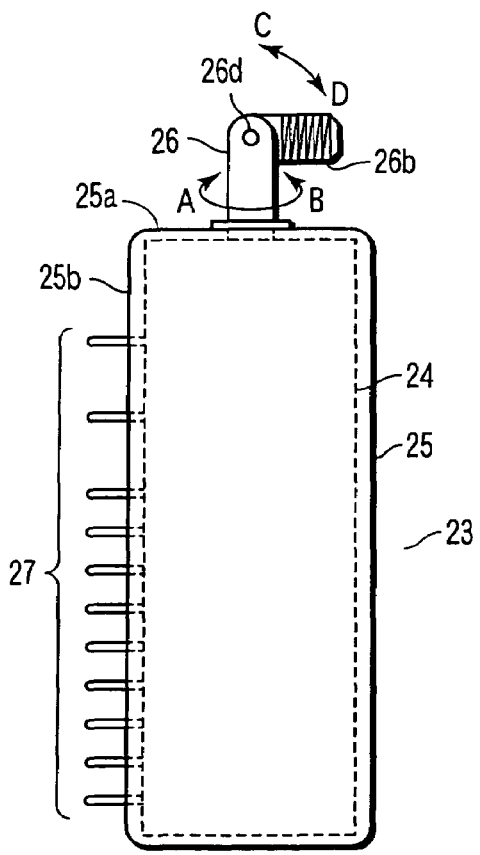
FIG. 6 is a diagram for use in explanation of a modification of the antenna input plug of the tuner of the television receiver of the present invention.

FIG. 6 shows a modification of the embodiment. In this diagram, corresponding parts to those in FIG. 3 are denoted by like reference numerals. The antenna input plug 26 is constructed so that it can rotate as indicated by arrows C and D with an axis 26d of rotation provided in its central portion as the center. That is, the angle through which the antenna input plug 26 is bent can be varied freely.

Figure 7:
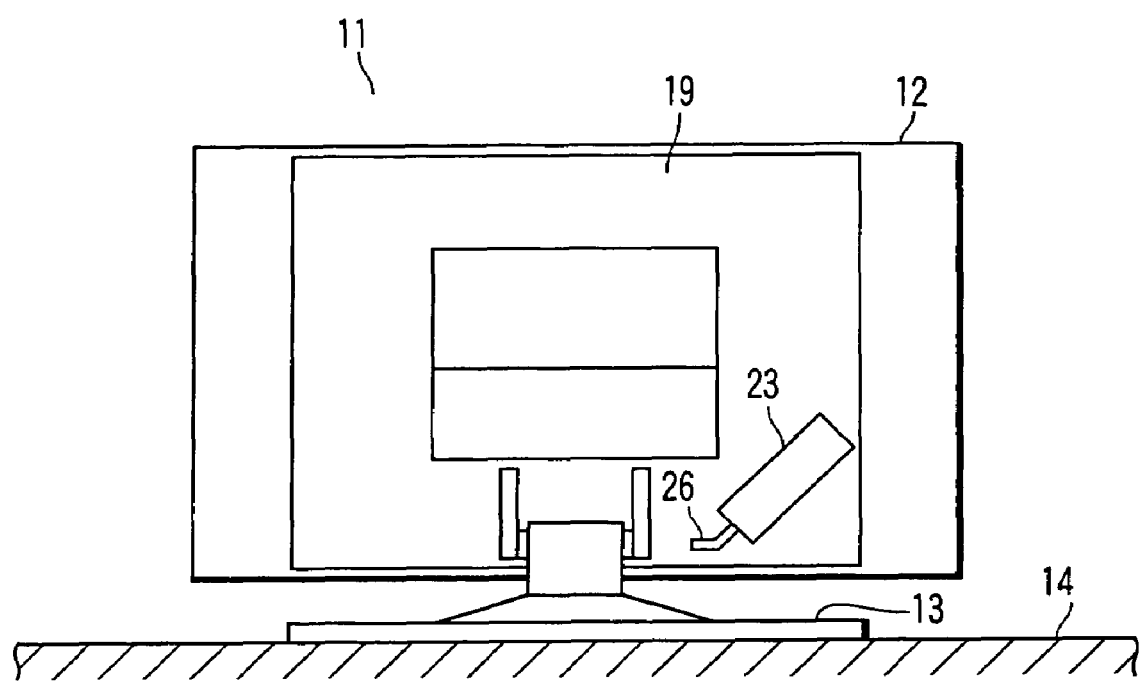
FIG. 7 is a diagram for use in explanation of the mounted condition of the tuner shown in FIG. 6.

By so doing, the tip portion of the antenna input plug 26 can be oriented right or left even if the tuner 23 is mounted to the main board 19 in a tilted position as shown in FIG. 7, allowing the degree of freedom in selection of the position in which the tuner 23 is mounted to be further increased.

The present invention is not limited to the embodiments described above. At the stage of practice of the invention, constituent elements can be variously modified without departing from the scope and spirit thereof. The constituent elements disclosed in the above embodiments can be combined appropriately to form various inventions. For example, some components may be removed from all the constituent elements shown in the embodiments. In addition, the constituent elements in the different embodiments may be combined appropriately.

What is claimed is:

1. A broadcast receiver comprising:

a tuner having a circuit board formed with a circuit block which down-converts an input radio-frequency signal to select a broadcast signal of a desired channel, a shield case formed in the shape of an almost rectangular parallelepiped to house the circuit board, an input plug which receives the radio-frequency signal, has its base portion connected to the circuit board and its tip portion protruded outward through one of the two end surfaces of the shield case which are opposed to each other in the direction of length, the tip portion being bent through a predetermined angle with respect to the base portion and the base portion being supported by the shield case so that it can rotate on its axis, and a terminal connected to the circuit board and protruded outward through one of the side surfaces of the shield case to output the selected signal;

a signal processing unit connected to the terminal and adapted to recover a video signal from the signal output from the terminal; and a display unit adapted to display the video signal recovered by the signal processing unit on a display panel, the tuner being mounted so that one of the four side surfaces of the shield case except the two end surfaces which are opposed to each other in the direction of length is parallel to the display panel of the display unit.

2. A broadcast receiver according to claim 1, wherein the input plug has its tip portion bent through almost 90 degrees with respect to the base portion.

3. A broadcast receiver according to claim 1, wherein the tuner is mounted so that, of the four side surfaces of the shield case except the two end surfaces which are opposed to each other in the direction of length, two side surfaces which are opposed to each other most closely are parallel to the display panel of the display unit.

4. A broadcast receiver according to claim 1, further comprising a support by which the broadcast received is placed on a base, and wherein the tuner is mounted so that, when the broadcast receiver is placed on the base through the support, the input plug is positioned on the base side.

5. A broadcast receiver comprising:

a tuner having a circuit board formed with a circuit block which down-converts an input radio-frequency signal to select a broadcast signal of a desired channel, a shield case formed in the shape of an almost rectangular parallelepiped to house the circuit board, an input plug which receives the radio-frequency signal, has its base portion connected to the circuit board and its tip portion protruded outward through one of the two end surfaces of the shield case which are opposed to each other in the direction of length, the tip portion being capable of being bent through variable angles with respect to the base portion and the base portion being supported by the shield case so that it can rotate on its axis, and a terminal connected to the circuit board and protruded outward through one of the side surfaces of the shield case to output the selected signal;

a signal processing unit connected to the terminal and adapted to recover a video signal from the signal output from the terminal; and a display unit adapted to display the video signal recovered by the signal processing unit on a display panel, the tuner being mounted so that one of the four side surfaces of the shield case except the two end surfaces which are opposed to each other in the direction of length is parallel to the display panel of the display unit.

6. A broadcast receiver according to claim 5, wherein the tuner is mounted so that, of the four side surfaces of the shield case except the two end surfaces which are opposed to each other in the direction of length, two side surfaces which are opposed to each other most closely are parallel to the display panel of the display unit.

7. A broadcast receiver according to claim 5, further comprising a support by which the broadcast received is placed on a base, and wherein the tuner is mounted so that, when the broadcast receiver is placed on the base through the support, the input plug is positioned on the base side.

* * * * *